US012777372B2

(12) United States Patent
Makki et al.

(10) Patent No.: US 12,777,372 B2
(45) Date of Patent: Oct. 27, 2026

(54) NETWORK RESOURCE ALLOCATION FOR PUBLIC SAFETY COMMUNICATIONS

(71) Applicant: Telefonaktiebolaget LM Ericsson (publ), Stockholm (SE)

(72) Inventors: Behrooz Makki, Pixbo (SE); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 607 days.

(21) Appl. No.: 17/923,555

(22) PCT Filed: May 4, 2021

(86) PCT No.: PCT/EP2021/061666

§ 371 (c)(1),
(2) Date: Nov. 4, 2022

(87) PCT Pub. No.: WO2021/224223

PCT Pub. Date: Nov. 11, 2021

(65) Prior Publication Data

US 2023/0189073 A1 Jun. 15, 2023

Related U.S. Application Data

(60) Provisional application No. 63/020,756, filed on May 6, 2020.

(51) Int. Cl.
*H04W 28/12* (2009.01)
*H04W 76/10* (2018.01)

(52) U.S. Cl.
CPC ........... *H04W 28/12* (2013.01); *H04W 76/10* (2018.02)

(58) Field of Classification Search
CPC ..................................................... H04W 76/50
See application file for complete search history.

(56) References Cited

U.S. PATENT DOCUMENTS

2020/0044732 A1* 2/2020 Cui ........................ H04W 76/50
2021/0029025 A1* 1/2021 Abedini ................ H04W 88/04
(Continued)

FOREIGN PATENT DOCUMENTS

WO 2020/032638 A1 2/2020
WO 2020/056700 A1 3/2020

OTHER PUBLICATIONS

3GPP TSG-RAN WG2 Meeting #102, Addition of Prioritized Random Access (Year: 2018).*
(Continued)

*Primary Examiner* — Ayaz R Sheikh
*Assistant Examiner* — Christopher R Davis
(74) *Attorney, Agent, or Firm* — Rothwell, Figg, Ernst & Manbeck, P.C.

(57) ABSTRACT

A method (600) in a network comprising a control node, a first access node, and a second access node, wherein there is a first link between the control node and the first access node and there is a second link between the first access node and the second access node, and wherein the second access node provides network access to a non-priority UE. The method includes the control node determining that a priority UE is attempting to establish a connection with the network. The method also includes, after determining that the priority UE is attempting to establish a connection with the network, the control node prioritizing at least the first link for the priority UE. The method also includes the control node determining an alternate link to the second access node for use in carrying traffic to and/or from the non-priority UE to which the second access node provides access, wherein the alternate link does not include the first link between the control node and the first access node.

18 Claims, 9 Drawing Sheets

(56) References Cited

U.S. PATENT DOCUMENTS

| | | | | |
|---|---|---|---|---|
| 2022/0053588 | A1* | 2/2022 | Shaheen | H04W 40/22 |
| 2022/0116814 | A1* | 4/2022 | Di Girolamo | H04L 65/80 |

OTHER PUBLICATIONS

International Search Report and Written Opinion dated Aug. 30, 2021 in International Application No. PCT/EP2021/061666 (14 pages).

LG Electronics Inc., "Discussion on route functionality in IAB", R2-1904941 (Revision of R2-1902170), 3GPP TSG-RAN WG2 #105bis, Xi'an, China, Apr. 8-12, 2019, XP051702220 (3 pages).

3GPP TR 38.874 V16.0.0, 3rd Generation Partnership Project; Technical Specification Group Radio Access Network; NR; Study on Integrated Access and Backhaul; (Release 16), Dec. 2018 (111 pages).

* cited by examiner

NETWORK RESOURCE ALLOCATION FOR PUBLIC SAFETY COMMUNICATIONS

CROSS REFERENCE TO RELATED APPLICATIONS

This application is a 35 U.S.C. § 371 National Stage of International Patent Application No. PCT/EP2021/061666, filed May 4, 2021, which claims priority to U.S. provisional patent application No. 63/020,756, filed on May 6, 2020. The above identified applications are incorporated by this reference.

TECHNICAL FIELD

Disclosed are embodiments related to network resource allocation.

BACKGROUND

Public safety communications are communications within a public safety authority or between different public safety authorities. The term 'authorities' refers to emergency first responders (fire-fighters, police, paramedics etc.), emergency control centers, public safety answering points (PSAP), local administration or any other organization with the responsibility of providing services that ensure safety and security of citizens who are under risk or affected by an emergency event. This type of communication may be a Mission Critical (MC) communication, where if the communication is lost, then the consequences may be dire.

Traditionally, the public safety community has used land mobile radio (LMR) systems for Push-to-Talk (PTT) as the primary mobile communication system. Terrestrial Trunked Radio (see en.wikipedia.org/wiki/Terrestrial_Trunked_Radio) and Project25 (a suite of standards for digital mobile radio communications designed for use by public safety organizations in North America—see en.wikipedia.org/wiki/Project_25) are the predominant modern PTT systems for MC communications and first responder usage. These narrowband systems provide voice-centric services with limited data capabilities. In addition, different public safety institutions typically use different networks (frequencies and technologies), which makes inter-agency communication difficult to coordinate.

To support more advanced MC services and use cases and thereby improve the situational awareness and enhance operational effectiveness and safety for first responders, MC communications will transition over the next decade from narrowband proprietary radio networks to Third Generation Partnership Project (3GPP) Fourth Generation (4G) and or Fifth Generation (5G) broadband networks. Many public safety communities have already begun the journey from using existing specialist narrowband technologies, combined with best-effort commercial data services such as 3G, and have recognized the need to move to critical broadband networks built using 4G (a.k.a., Long Term Evolution (LTE)) technology, where all their applications (voice, data and video) can be hosted successfully on the same network, and with the ability to continuously leverage the latest advancements in 3GPP technologies such as 5G.

High availability and reliability are key requirements of public safety. For instance, when a police officer is in a dangerous situation, the officer must be able to rely on their radio device (a.k.a., user equipment (UE)). On the other hand, public safety systems should be able to provide temporally on-demand coverage. For instance, with a building on fire, we may need to extend the indoor coverage area immediately such that the fire fighters inside the burning building have good network coverage with high reliability and low latency regardless of the floor of building in which they are located. Also, compared to non-priority UEs, these priority UEs (e.g., MC UEs) have higher priority to be served, which poses the requirement of rapid adaptation of resource allocation/topology adaptation of the communication network.

In 3GPP LTE and New Radio (NR) systems, the Quality of Service (QoS) requirements for MC services (e.g., MC push-to-talk (MCPTT), MCData and MCvideo) are very strict. A MC communication system needs to provide high availability and high reliability for MC services in all scenarios where the MC UEs are within terrestrial cellular network coverage or out of terrestrial cellular network coverage. In critical situations where the network is overloaded, high priority and pre-emption functionalities are needed to ensure that MC UEs' traffic flows under network congestion.

In 3GPP, there is ongoing work related to Integrated Access and Backhaul (IAB) based on earlier study item documented in 3GPP TR 38.874. With IAB, the idea is to densify the network with a large number of access points (APs) each one serving a number of UEs inside one of its cells. Here, while one of the IAB nodes (called the IAB donor) is connected to a core network via fiber connection, in a multi-hop setup, the following IAB nodes are wirelessly backhauled. Compared to the cases with few macro base stations (BSs) covering a wide area, less path loss/shadowing, and higher line-of-sight (LOS) connection probability are expected in IAB networks. As a result, better channel quality is experienced in these short-range links, compared to the cases with few macro BSs. Also, along with reducing the installation costs, IAB networks increase the flexibility to provide quick coverage for areas of interest.

SUMMARY

Certain challenges presently exist. For instance, certain public safety systems are based on simple voice-based communications with low adaptation capability, and, as a result, they suffer from low on-demand coverage and availability, especially when the size of the network increases. On the other hand, with priority UEs (e.g., UEs used by a first responder) in a network, the non-priority UEs may experience no connections or poor connections. Also, it is desirable to develop methods which facilitate the connection process in the networks consisting of priority UEs, and provide them with quick coverage as soon as they ask for communication. Finally, the current resource multiplexing in the IAB design is not optimized for the cases where different UEs have different priorities and service requirements.

Accordingly, in one aspect there is provided a control node method in a network comprising a control node, a first access node, and a second access node, where there is a first link between the control node and the first access node and there is a second link between the first access node and the second access node. The second access node provides network access to a non-priority UE. The method includes the control node determining that a priority UE is attempting to establish a connection with the network. The method also includes, after determining that the priority UE is attempting to establish a connection with the network, the control node prioritizing at least the first link for the priority UE. The method also includes the control node determining an alternate link to the second access node for use in carrying traffic to and/or from the non-priority UE to which the second access node provides access, wherein the alternate link does not include the first link between the control node and the first access node.

In another aspect there is provided a computer program comprising instructions which when executed by processing circuitry of a control node causes the control node to perform any of the control node methods disclosed herein. In one embodiment, there is provided a carrier containing the computer program wherein the carrier is one of an electronic signal, an optical signal, a radio signal, and a computer readable storage medium. In another aspect there is provided a control node that is configured to perform any of the control node methods disclosed herein. The control node may include memory and processing circuitry coupled to the memory.

In another aspect there is provided an access node method in a network comprising a control node, a first access node, and a second access node. There is a first link between the control node and the first access node, and there is a second link between the second access node and the first access node. The method includes the second access node providing network access to a non-priority UE. The method also includes the second access node determining that a priority UE is attempting to establish a connection with the network. The method also includes, after determining that the priority UE is attempting to establish a connection with the network, the second access node prioritizing the second link for the priority UE. The method further includes the second node determining an alternate link to the control node for use in carrying traffic for and/or from the non-priority UE, wherein the alternate link does not include the second link between the second access node and the first access node.

In another aspect there is provided a computer program comprising instructions which when executed by processing circuitry of an access node causes the access node to perform any of the access node methods disclosed herein. In one embodiment, there is provided a carrier containing the computer program wherein the carrier is one of an electronic signal, an optical signal, a radio signal, and a computer readable storage medium. In another aspect there is provided an access node that is configured to perform any of the access node methods disclosed herein. The access node may include memory and processing circuitry coupled to the memory.

Advantages of the embodiment include enabling an adaptive IAB network to, among other things, serve public safety systems. For example, priority UEs can be provided with quick, on-demand coverage, thereby reducing the access delay, and, at the same time, adequately serving the non-priority UEs. In one embodiment, resource allocation, routing, and/or scheduling is adapted such that priority UEs are served with high priority, and the non-priority UEs (a.k.a., "normal" UEs) are served by the IAB nodes in some so-called "dead" periods. Also, in some embodiments, the resource allocation is updated and, possibly, new IAB nodes are added to the network, to guarantee the service rate constraints of the priority UEs. Further, in some embodiments, the channel measurements from non-priority UEs, the network load distribution, and traffic prediction of priority UEs can be used to facilitate a rapid decision making on resource allocation and the topology adaptation of the IAB network.

BRIEF DESCRIPTION OF THE DRAWINGS

The accompanying drawings, which are incorporated herein and form part of the specification, illustrate various embodiments.

DETAILED DESCRIPTION

Figure 1:
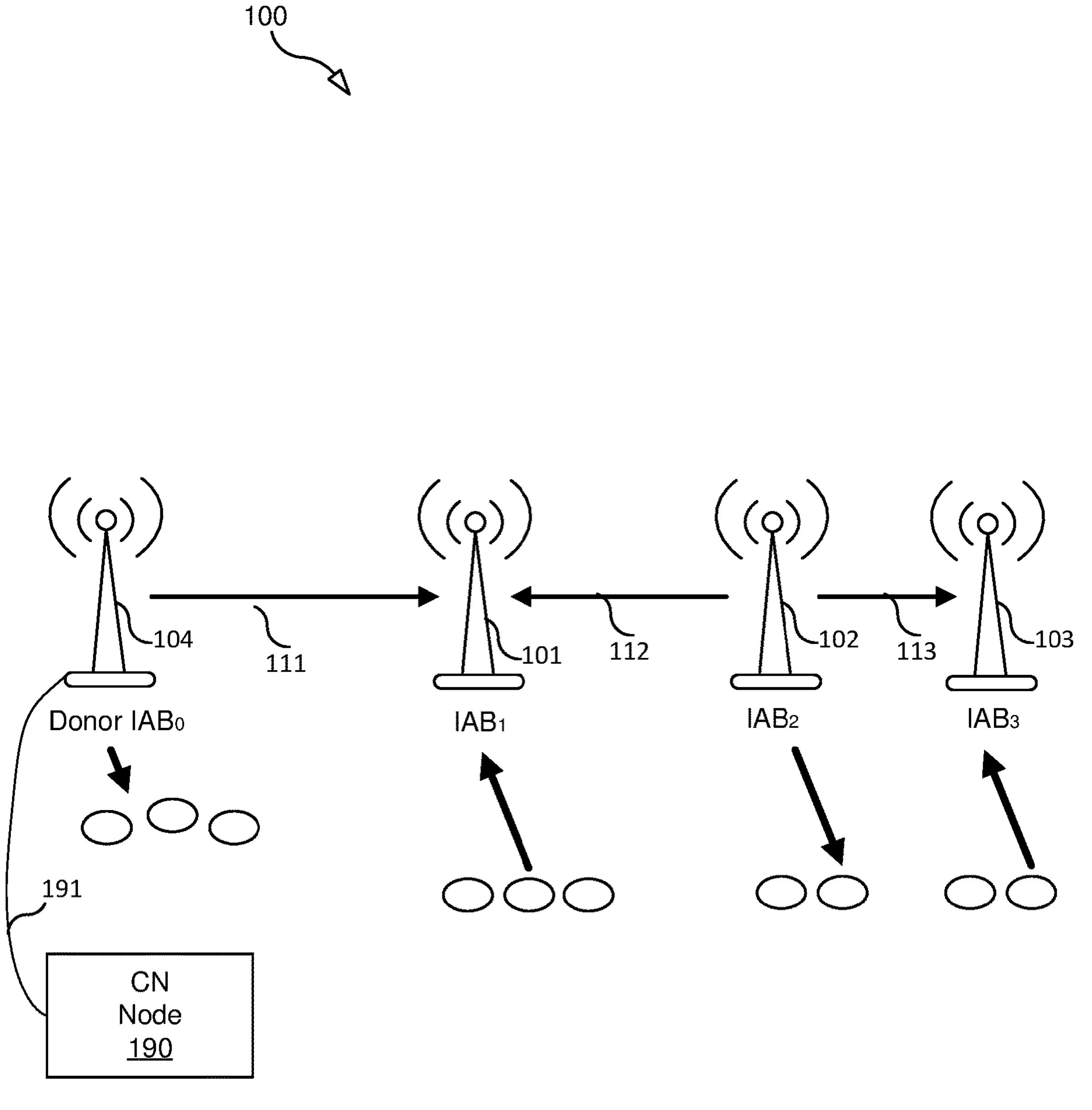
FIG. 1 illustrates an IAB network according to an embodiment.

FIG. 1 illustrates an IAB network 100 according to an embodiment. As illustrated in FIG. 1, IAB network includes: i) an IAB control node 104 (a.k.a., Donor IAB, IAB-Donor, or $IAB_0$) that has a connection 191 (e.g., fiber connection) to a core network node 190 and ii) IAB access nodes 101-103 (a.k.a., IAB-nodes). Nodes 101-104 may serve one or more UEs (represented in FIG. 1 as the small ovals). As further illustrated in FIG. 1, there is i) a first direct wireless backhaul link 111 between $IAB_0$ and $IAB_1$, ii) a second direct wireless backhaul link 112 between $IAB_1$ and $IAB_2$, and iii) a third direct wireless backhaul link 113 between $IAB_2$ and $IAB_3$.

In IAB networks, for communications over the wireless backhaul links, the UL and DL transmission does not follow the common definition, as both endpoints of the backhaul links are IAB nodes. However, for simplicity, we refer to data transmission from an IAB-node 101, 102, 103 towards the IAB-donor 104 as UL transmission, and we refer to data transmission from the IAB-donor 104 towards an IAB-node as DL transmission. The proposed setup is applicable for both DL and UL transmissions.

Figure 2:
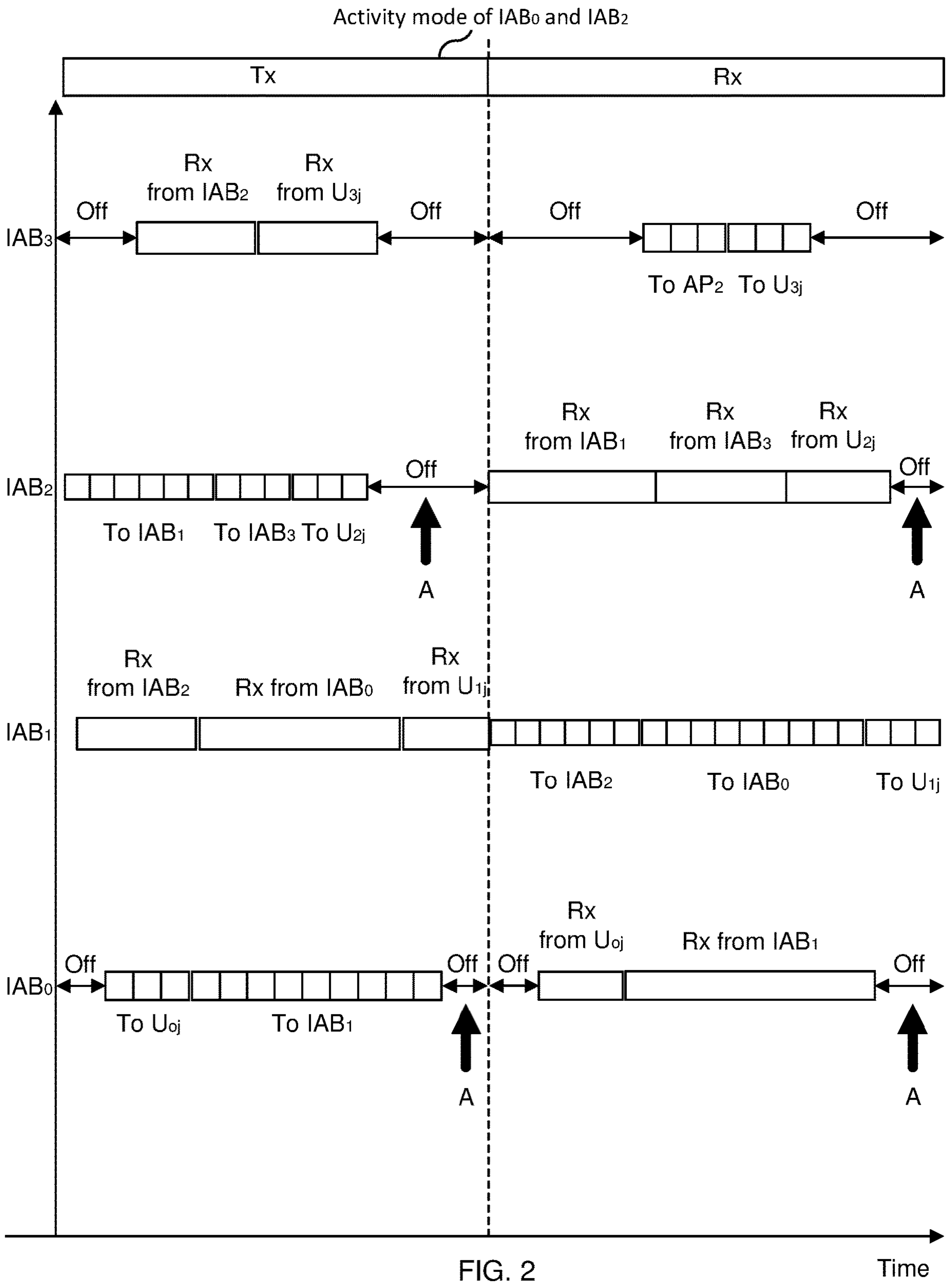
FIG. 2 illustrates dead periods according to an embodiment.

We may consider different scheduling mechanisms for IAB networks and the proposed method is applicable for different methods of resource allocation. In one example approach, as shown in FIG. 2, for each IAB node 101-104, a time slot is divided into transmit (Tx) and receive (Rx) sub-slots and in each one we have backhaul and access communications (here, the slot is a general term which can be interpreted as any time duration, e.g., it can be a number of subframes, or a number of slots or it can be a TDD configuration period for IAB as defined in 3GPP). Then, with an IAB node being in, e.g., Tx mode, its neighbor IAB nodes in both upstream and downstream are in the Rx mode. Let us consider a network with N IAB nodes and m UEs per IAB node. Also, we denote the UEs served by $IAB_i$ by $U_{ij}$, $j=1, \ldots, m$.

Considering FIG. 2, in each slot the IAB-donor needs to send 2 Nm signals (for both its m UEs (m DL and m UL signals) in access and the DL/UL backhaul signals for $(N-1)m$ UEs of the other IAB nodes). Then, it can be easily shown that IAB node $i>0$ needs to transfer $2(2Nm-im)$ signals in total (access and backhaul, DL and UL). As a result, the second node, $IAB_1$ in FIG. 1, is the busiest node being active during the whole time slot, while other nodes may be off in some periods. These periods, which we refer to as "reserved" or "dead" periods, are time slots where one IAB node may be off and wait for the previous hops to finish their data transmission. As an example, consider Point A in FIG. 2 where, while $IAB_1$ performs access communication, $IAB_0$ and $IAB_2$ are off.

On the other hand, priority UEs (e.g., public safety UEs) need on-demand coverage with high reliability and low end-to-end transmission delay. For instance, consider a public safety network where a building on fire should be covered immediately. Also, the public safety UEs have higher priority, compared to normal UEs. Finally, as opposed to normal UEs, the public safety UEs may come to the network abruptly with no pre-planning. Thus, with public safety UEs accessing to the network, we need to adapt the resource allocation quickly such that they are covered with high reliability/availability. At the same time, it is desirable to still serve as many as possible normal UEs. This is a motivation for this disclosure.

This disclosure describes an adaptive IAB-based data transmission method for, among other things, public safety networks. An objective is to: 1) provide the priority UEs with quick on-demand coverage, 2) reduce the delay of access to the network in the presence of priority UEs, and 3) at the same time, serve as many as possible normal UEs.

Figure 3:
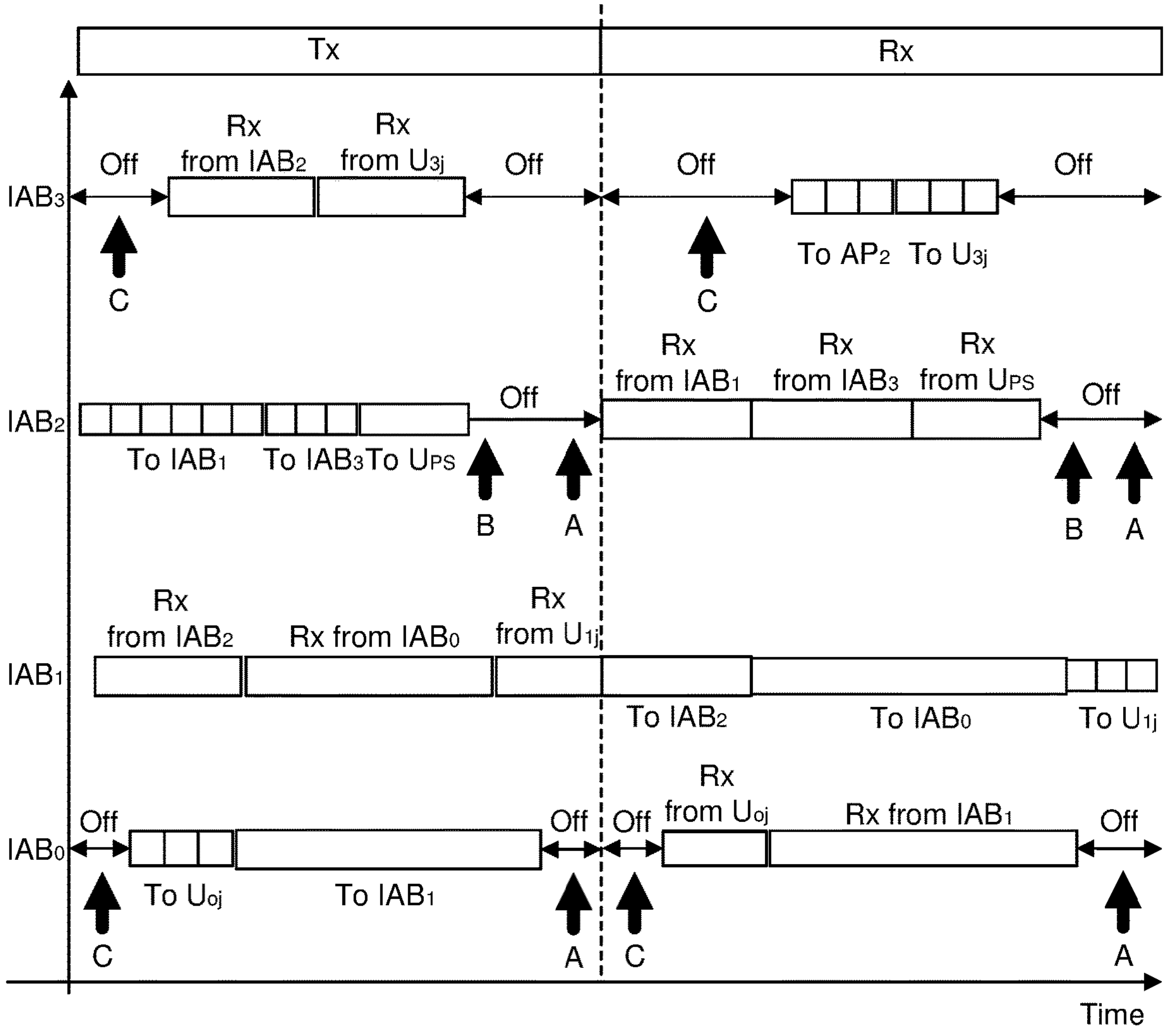
FIG. 3 illustrates dead periods according to an embodiments.
Figure 4:
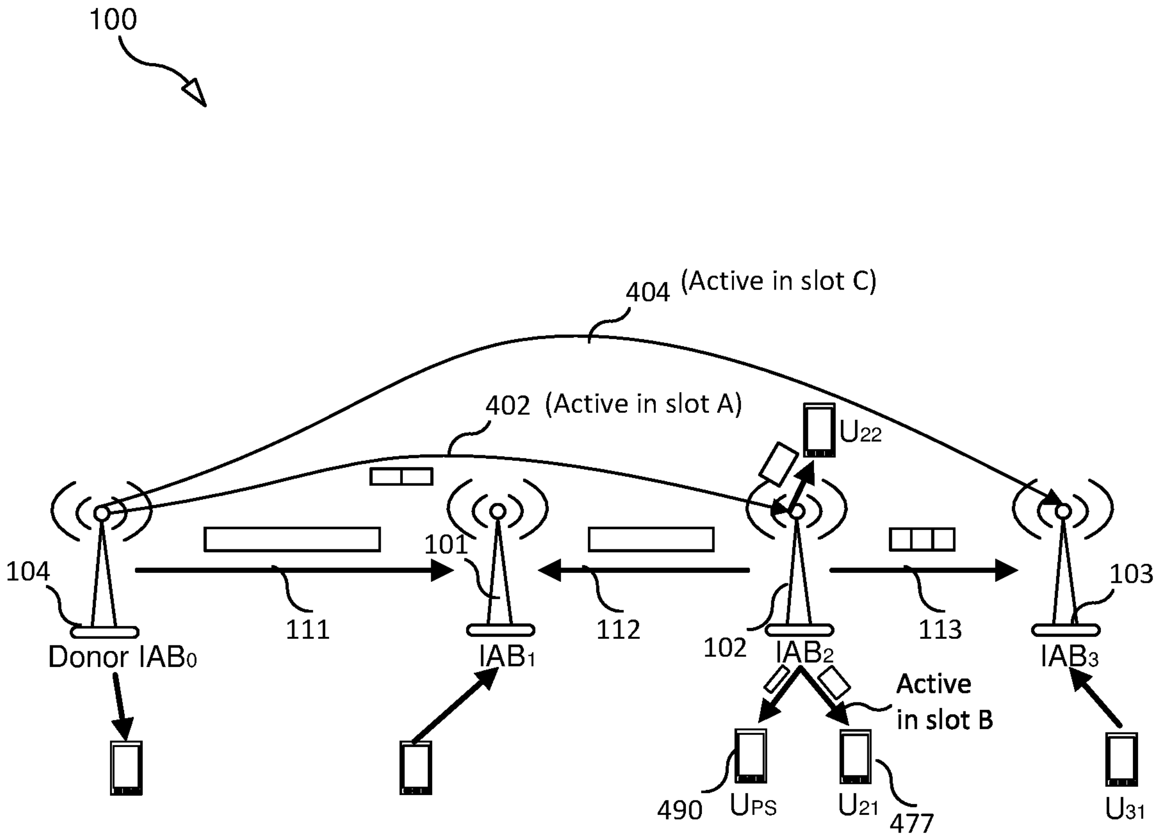
FIG. 4 illustrates a priority UE attempting to connect to the IAB network.

Let us assume that a priority UE 490 (see FIG. 4), denoted $U_{PS}$ in FIG. 4, is attempting to access network 100 (e.g., the priority UE is performing a well-known random access procedure), where network 100 is currently serving normal UEs, e.g., $U_{21}$, $U_{22}$ and $U_{31}$. In this way, the data transmission may, in some embodiments, be adapted as follows:

1) At least part of the spectrum resources of the direct $IAB_0$-$IAB_1$-$IAB_2$ path is allocated to the priority UE, $U_{PS}$. Also, according to the service rate requirements of the priority UE, the resource allocation (e.g., the scheduling and rate/power allocation are updated). Moreover, the IAB-nodes $IAB_1$ and $IAB_2$ clear their respective buffers the buffered data of the normal UEs which are not supposed to be served through the $IAB_0$-$IAB_1$-$IAB_2$ path, to keep the buffers free for possible use in data transmission/from the priority UE.
2) The normal UEs, i.e., $U_{21}$, $U_{22}$ and $U_{31}$, are served through the direct transmission from $IAB_0$ to $IAB_2$ and $IAB_3$ during the dead periods. For instance, considering FIG. 4, $IAB_0$ uses the direct $IAB_0$-$IAB_2$ link 402 to directly send the data of $U_{21}$ and $U_{22}$ to $IAB_2$ during the dead period A shown in FIG. 3. Then, $IAB_2$ uses the dead period B shown in FIG. 3 for access to $U_{21}$ and $U_{22}$. On the other hand, $IAB_0$ uses the dead period C in FIG. 3 to serve $IAB_3$ with the data of $U_{31}$ directly. Then, because the $IAB_0$-$IAB_2$ link 402 and $IAB_0$-$IAB_3$ link 404 experience lower signal-to-interference plus noise ratios (SINRs), compared to the links in the $IAB_0$-$IAB_1$-$IAB_2$ path, the data rates and beamforming of, e.g., $IAB_0$ will be adapted correspondingly. In this way, the normal UEs still receive their required messages, but with lower rate/higher scheduling delay.
3) The channel measurements from normal UEs, the network load distribution, and traffic prediction of priority UEs can be used to facilitate the rapid decision making on resource allocation and the topology adaptation of the IAB network (e.g., the radio resources, the rate adaptation/beamforming rules, which are required for data transmission in the direct $IAB_0$-$IAB_2$ and $IAB_0$-$IAB_3$ links, are determined offline, and before priority UE attempts to connect to the IAB-donor). Then, with a priority UE requesting access, the data transmission to the normal UE is immediately switched to the alternative paths and dead periods. This makes it possible for the priority UE to get connected to the network with low delay/contention probability.

As illustrated above, when a priority UE accesses the network (e.g., performs the random access procedure to establish a Radio Resource Control (RRC) connection with $IAB_0$), at least some of the non-priority UEs are served by the IAB nodes during the dead periods. Also, the routing for data transmission to the non-priority UEs is adapted such that the direct link between $IAB_0$ and $IAB_1$ and the direct link between $IAB_1$ and $IAB_2$ are kept free for the data transmission to the priority UE. Finally, the resource allocation and the rate adaptation/beamforming to IAB paths connecting to the non-priority UEs during the dead periods are determined offline such that the network is prepared to switch to the alternative paths immediately, when a priority UE attempts to establish a connection with the network.

In this way, the presence of IAB nodes increases the coverage and improves the reliability for data transmission to priority UEs. Also, the proposed scheme makes it possible to serve the priority UEs with low latency and guarantee their service rate requirements while at the same time serve as many normal UEs as possible.

It is noted that, depending on the service rate requirements of the priority UE, still some parts of the spectrum resources in the $IAB_0$-$IAB_1$-$IAB_2$ path may be available for the normal UEs, and only some of them may be moved to the alternative paths.

In one embodiments, $U_{31}$ is being served through the $IAB_0$-$IAB_3$ link during the dead period C. The associated data of $U_{31}$ can, however, be sent through the $IAB_0$-$IAB_2$-$IAB_3$ path, depending on the number of UEs/channels qualities.

Figure 5:
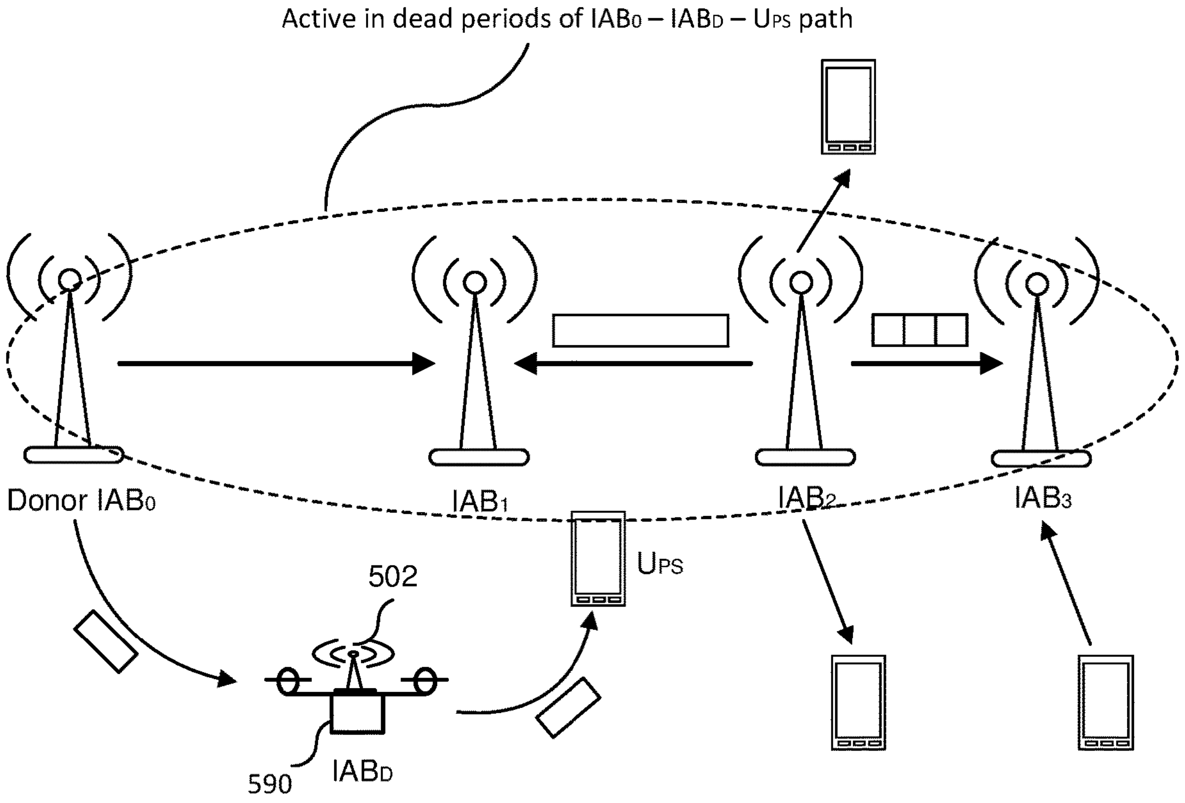
FIG. 5 illustrates adding a new IAB access node to an existing IAB network.

In another embodiment (see FIG. 5), a new IAB-node (IABD) 502 (e.g., an IAB-node that is carried by a drone 590) can be added to the network 100. In such setup, the donor $IAB_0$ may prioritize the $IAB_0$-IABD-$U_{PS}$ path and be connected to the $IAB_0$-$IAB_1$-$IAB_2$-$IAB_3$ path only in the dead periods of the $IAB_0$-IABD-$U_{PS}$ path. In such cases, the IAB nodes of the $IAB_0$-$IAB_1$-$IAB_2$-$IAB_3$ path do not need to adapt their beamforming and perform channel measurement for data transmission in the dead periods.

In short, as described herein, the network adapts the resource allocation and/or the routing and backhaul topology to serve priority UEs with high priority and guaranteed QoS, while some normal UEs are served by the IAB nodes in some "reserved" or "dead" periods. The channel measurements from normal UEs, the network load distribution, and traffic prediction of priority UEs are be used to facilitate a rapid decision making on resource allocation and the topology adaptation of the IAB network.

SUMMARY OF VARIOUS EMBODIMENTS

Figure 6:
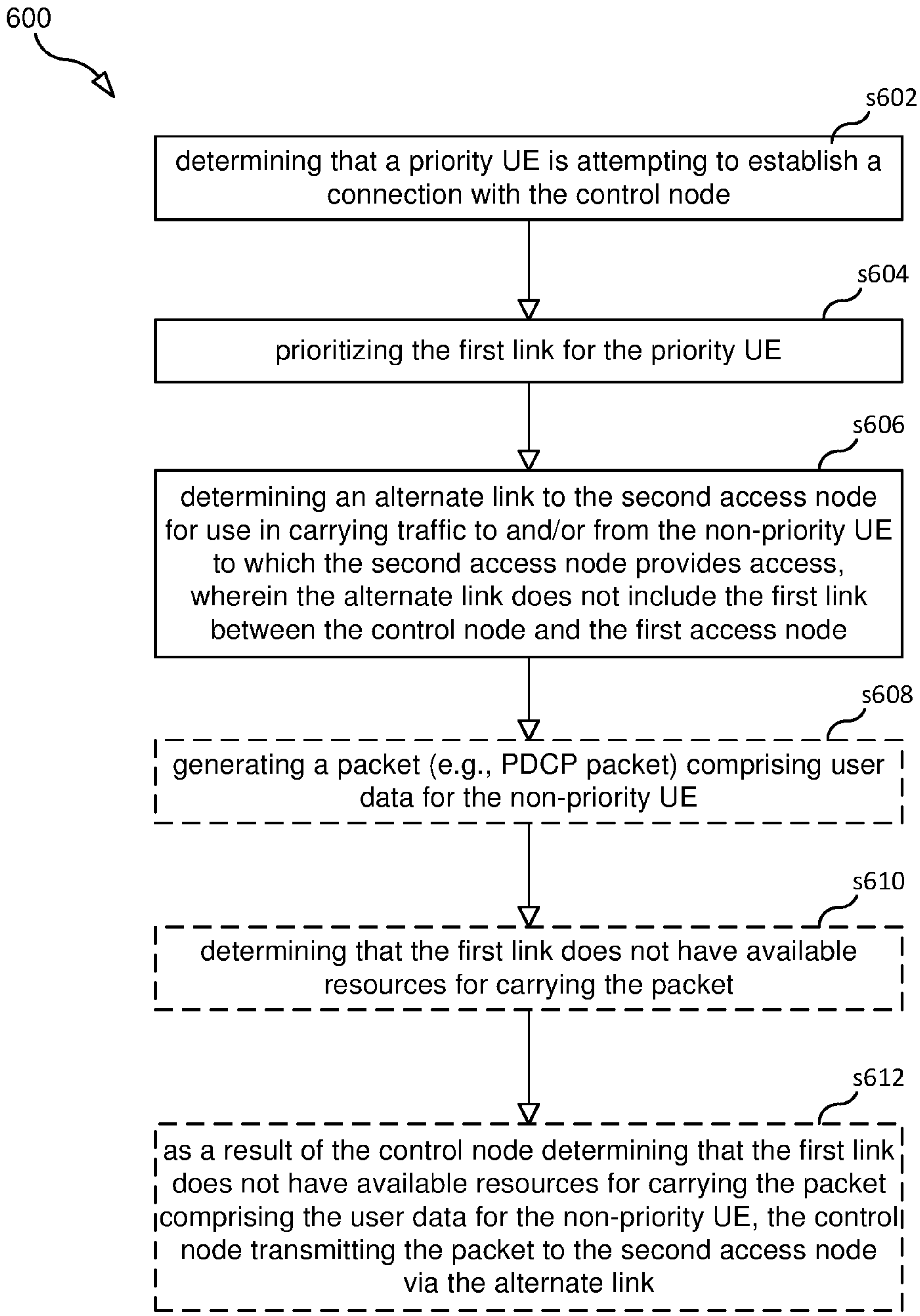
FIG. 6 is a flowchart illustrating a process according to some embodiments.

A1. A method 600 (see FIG. 6) in a network (e.g., network 100) comprising a control node (e.g., IAB-donor 104), a first access node (e.g., first IAB-node 101), and a second access node (e.g., second IAB-node 102), wherein there is a first link (e.g., a direct link such as a line-of-sight (LOS) link 111) between the control node and the first access node and there is a second link (e.g., link 112) between the first access node and the second access node, and wherein the second access node provides network access to a non-priority UE (e.g., 477), the method comprising: the control node determining (step s602) that a priority UE (e.g., a Mission Critical (MC) UE 490) is attempting to establish a connection (e.g., an RRC connection) with the network; after determining that the priority UE is attempting to establish a connection with the network, the control node prioritizing (step s604) at least the first link for the priority UE; and the control node determining (step s606) an alternate link (e.g., link 402) to the second access node for use in carrying traffic to and/or from the non-priority UE to which the second access node provides access, wherein the alternate link does not include the first link between the control node and the first access node.

A2. The method of embodiment A1, further comprising: the control node generating (step s608) a packet (e.g., PDCP packet) comprising user data for the non-priority UE; the control node determining (step s610) that the first link does not have available resources for carrying the packet; and as a result of the control node determining that the first link does not have available resources for carrying the packet comprising the user data for the non-priority UE, the control node transmitting (step s612) the packet to the second access node via the alternate link.

A3. The method of embodiment A2, wherein transmitting the packet to the second access node via the alternate link comprises: the control node buffering the packet at least until the occurrence of a dead period (i.e., a period of time during which the control node does not have the opportunity to transmit data to first access node via the first link); and during the dead period, transmitting the data to the second access node via the alternate link.

A4. The method of embodiment A1 or A2, further comprising the second access node prioritizing the second link between the second access node and the first access node for the priority UE.

A5. The method of embodiment A3, further comprising: the second access node receiving data transmitted by the non-priority UE; the second access node determining that the second link between the second access node and the first access node does not have available resources for carrying the data transmitted by the non-priority UE; and as a result of the second access node determining that the direct link between the second access node and the first access node does not have available resources for carrying the data transmitted by the non-priority UE, the second access node transmitting the data to the control node via the alternate link.

A6. The method of embodiment A5, wherein transmitting the data to the control node via the alternate link comprises: the second access node buffering the data at least until the occurrence of a dead period during which the second access node does not have the opportunity to transmit data to first access node via the second link; and during the dead period, transmitting the data to the control node via the alternate link.

A7. The method of any one of embodiments A1-A6, further comprising: the second access node determining that the priority UE is attempting to establish a connection with the network via the second access node; and after determining that the priority UE is attempting to establish the connection, the second access node freeing resources and allocating the freed resources to the priority UE.

A8. The method of embodiment A7, wherein freeing resources comprises the second access node clearing from a transmit buffer for the second link between the second access node and the first access node data that was received from the non-priority UE or prepared for transmitting to the non-priority UE, thereby freeing resources for the priority UE.

A9. The method of any one of embodiments A1-A6, further comprising: the first access node determining that the priority UE is attempting to establish a connection with the network; and after determining that the priority UE is attempting to establish the connection, the first access node freeing resources and allocating the freed resources to the priority UE.

A10. The method of any one of embodiments A1-A9, wherein the control node determines that the priority UE is attempting to establish a connection with the network by receiving, via the first link, a Radio Resource Control (RRC) message (e.g., RRC Connection Request) transmitted by the priority UE (e.g., the RRC message is contained in signaling that is received at the second access node and relayed to the first access node via the second link 112, and the first access node then relays this signaling to the control node via the first link 111).

A11. The method of any one of embodiments A1-A10, wherein the control node determines the alternate link to the second access node prior to the control node determining that the priority UE is attempting to establish a connection with the network.

A12. The method of embodiment A11, wherein the control node determines the alternate link to the second access node based on a predicted channel condition (e.g., a predicted channel condition of the alternate link), a distribution of traffic in the network, and/or a traffic prediction for the priority UE (e.g., a predication indicating an amount of UL and/or DL network traffic that the UE is expected to send/receive).

A13. The method of any one of embodiments A1-A12, further comprising: after determining that the priority UE 490 is attempting to establish a connection, prioritizing 604 the second link 112 for the priority UE.

A14. The method of any one of embodiments A1-A13, further comprising: after the control node determines 602 that a priority UE 490 is attempting to establish a connection with the network, the control node transmitting to the first and/or second access node a message comprising an identifier identifying the priority UE and indicating that the identified UE is a priority UE.

Figure 7:
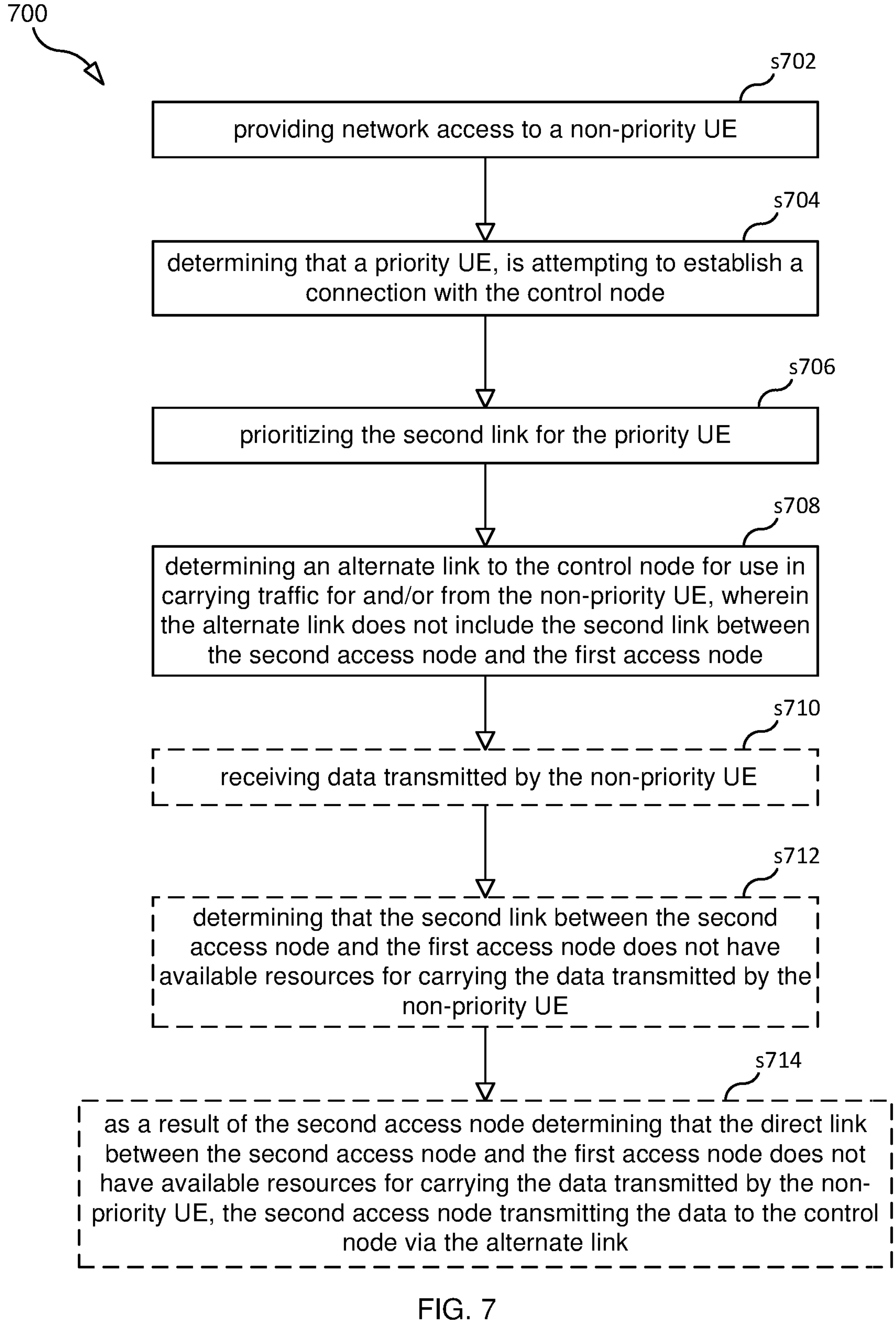
FIG. 7 is a flowchart illustrating a process according to some embodiments.

B1. A method 700 (see FIG. 7) in a network (e.g., network 100) comprising a control node (e.g., an IAB-donor 104), a first access node (e.g., first IAB-node 101), and a second access node (e.g., second IAB-node 102), wherein there is a first link (e.g., direct link 111 such as a line-of-sight (LOS) link) between the control node and the first access node and there is a second link (e.g., link 112) between the second access node and the first access node, the method comprising: the second access node providing (step s702) network access to a non-priority user equipment, UE; the second access node determining (step s704) that a priority UE (e.g., UE 490) is attempting to establish a connection with the network; after determining that the priority UE is attempting to establish a connection with the network, the second access node prioritizing (step s706) the second link for the priority UE; and the second node determining (step s708) an alternate link to the control node for use in carrying traffic for and/or from the non-priority UE, wherein the alternate link does not include the second link between the second access node and the first access node.

B2. The method of embodiment B1, further comprising: the second access node receiving (step s710) data transmitted by the non-priority UE; the second access node determining (step s712) that the second link between the second access node and the first access node does not have available resources for carrying the data transmitted by the non-priority UE; and as a result of the second access node determining that the direct link between the second access node and the first access node does not have available resources for carrying the data transmitted by the non-priority UE, the second access node transmitting (step s714) the data to the control node via the alternate link.

B3. The method of embodiment B2, wherein transmitting the data to the control node via the alternate link comprises: the second access node buffering the data at least until the occurrence of a dead period during which the second access node does not have the opportunity to transmit data to first access node via the second link; and during the dead period, transmitting the data to the control node via the alternate link.

B4. The method of any one of embodiments B1-B3, further comprising: after determining that the priority UE is attempting to establish the connection, the second access node freeing resources and allocating the freed resources to the priority UE.

B5. The method of embodiment B4, wherein freeing resources comprises the second access node clearing from a transmit buffer for the second link between the second access node and the first access node data that was received from the non-priority UE, thereby freeing resources for the priority UE.

B6. The method of any one of embodiments B1-B5, wherein the second access node determines that a priority UE is attempting to establish a connection with the network via the second access node by: i) receiving, via a Physical Random Access Channel, PRACH, a random access preamble transmitted by the priority UE or ii) or receiving a priority identifier (e.g., the access identity of the priority UE, or the access category of the priority UE, or the 5G QoS Identifier (5QI) of the service requested by the priority UE) from the control node (that is, the control node, in one embodiments, informs the second access node that a UE that the second access node is communicating with is a priority UE).

B7. The method of any one of embodiments B1-B6, wherein the non-priority UE is a fixed UE (e.g., a router, a sensor, an appliance) and the second access determines the alternate link to the control node prior to the second access node determining that the priority UE is attempting to establish the connection.

B8. The method of embodiment B1-B5, wherein the second access node determines that a priority UE is attempting to establish a connection with the network via the second access node by receiving, via a Physical Random Access Channel, PRACH, a random access preamble transmitted by the priority UE and determining that the random access preamble is a preamble reserved for priority UEs or determining that a PRACH occasion that was used to transmit the random access preamble is reserved for priority UEs.

C1. A computer program comprising instructions which when executed by processing circuitry of a control node 104 causes the control node 104 to perform the method of any one embodiments A1-A3, or A10-A14.

C2. A computer program comprising instructions which when executed by processing circuitry of an access node 102 causes the access node 102 to perform the method of any one embodiments B1-B8.

C3. A carrier containing the computer program of embodiment C1 or C2, wherein the carrier is one of an electronic signal, an optical signal, a radio signal, and a computer readable storage medium.

D1. A control node 104, the control node being adapted to perform the method of any one of embodiments A1-A3, or A10-A14.

E1. A control node 104, the control node comprising: processing circuitry; and a memory, the memory containing instructions executable by the processing circuitry, whereby the control node is operative to perform the method of any one of the embodiments A1-A3, or A10-A14.

F1. An access node 102, the access node being adapted to perform the method of any one of embodiments B1-B8.

G1. An access node 102, the access node comprising: processing circuitry; and a memory, the memory containing instructions executable by the processing circuitry, whereby the access node is operative to perform the method of any one of the embodiments B1-B8.

Figure 8:
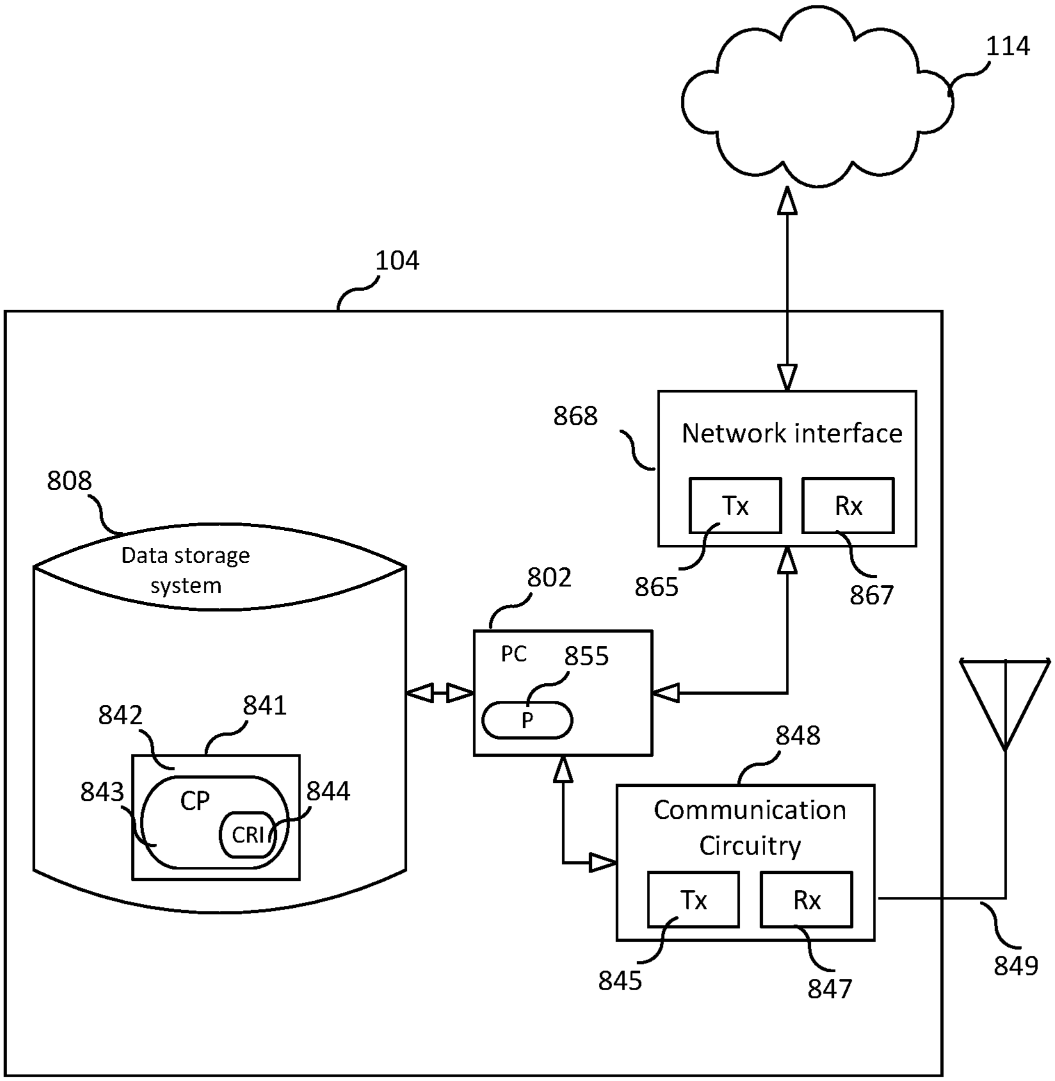
FIG. 8 illustrates an IAB control node according to some embodiments.

FIG. 8 is a block diagram of control node 104, according to some embodiments, for performing network node methods disclosed herein. As shown in FIG. 8, control node 104 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., control node 104 may be a distributed computing apparatus); at least one network interface 868 comprising a transmitter (Tx) 865 and a receiver (Rx) 867 for enabling control node 104 to transmit data to and receive data from other nodes connected to a core network 110 (e.g., an Internet Protocol (IP) network) to which network interface 868 is connected; communication circuitry 848, which is coupled to an antenna arrangement 849 comprising one or more antennas and which comprises a transmitter (Tx) 845 and a receiver (Rx) 847 for enabling control node 104 to transmit data and receive data (e.g., wirelessly transmit/receive data); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes control node 104 to perform steps described herein (e.g., steps described herein with reference to the flow charts). In other embodiments, control node 104 may be configured to perform steps described herein without the need for code. That is, for example, PC 802 may consist merely of one or more ASICs. Hence, the features of the embodiments described herein may be implemented in hardware and/or software.

Figure 9:
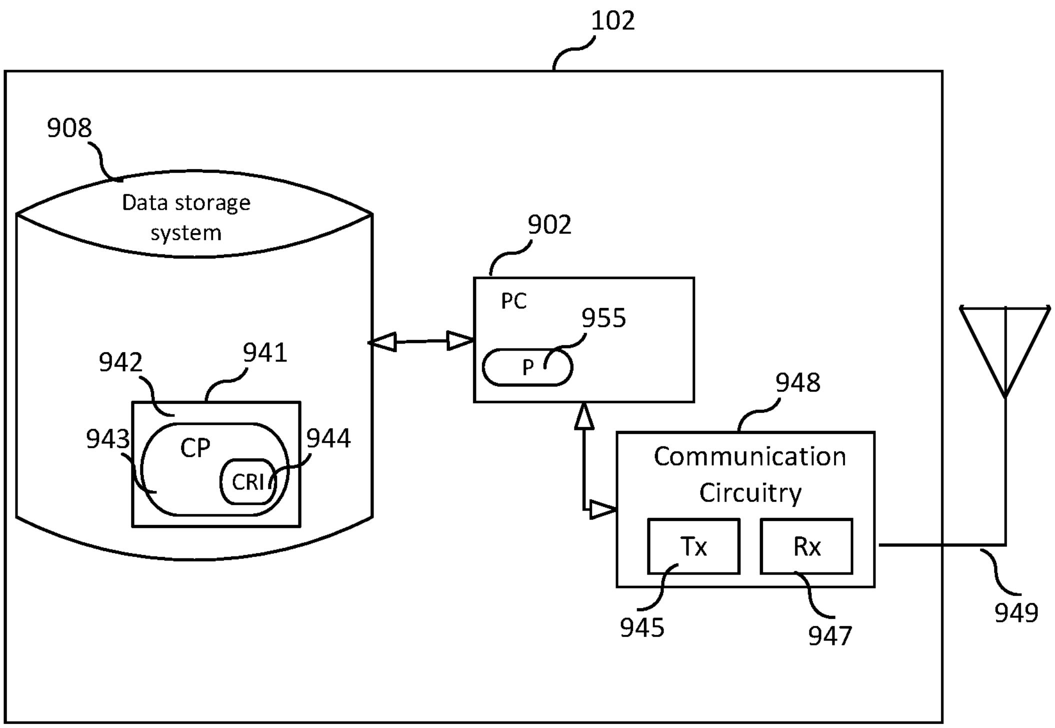
FIG. 9 illustrates an IAB access node according to some embodiments.

FIG. 9 is a block diagram of access node 102, according to some embodiments. As shown in FIG. 9, access node 102 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like); communication circuitry 948, which is coupled to an antenna arrangement 949 comprising one or more antennas and which comprises a transmitter (Tx) 945 and a receiver (Rx) 947 for enabling access node 102 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes access node 102 to perform steps described herein (e.g., steps described herein with reference to the flow charts). In other embodiments, access node 102 may be configured to perform steps described herein without the need for code. That is, for example, PC 902 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method in an integrated access and backhaul (IAB) network comprising a control node wherein the control node is a donor node in the IAB network, a first access node wherein the first access node is a parent node in the IAB network, and a second access node wherein the second access node is a child node of the first access node in the IAB network, wherein there is a first link between the control node and the first access node and there is a second link between the first access node and the second access node, and wherein the second access node provides network access to a non-priority user equipment (UE) the method comprising:

the control node determining that a priority UE is attempting to establish a connection with the network;

after determining that the priority UE is attempting to establish a connection with the network, the control node prioritizing at least the first link for the priority UE; and the control node determining an alternate link to the second access node for use in carrying traffic to and/or from the non-priority UE to which the second access node provides access, wherein the control node determines the alternate link to the second access node prior to the control node determining that the priority UE is attempting to establish a connection with the network, and the control node determines the alternate link to the second access node based on a predicted channel condition, a distribution of traffic in the network, and/or a traffic prediction for the priority UE.

2. The method of claim 1, further comprising:

the control node generating a packet comprising user data for the non-priority UE;

the control node determining that the first link does not have available resources for carrying the packet; and as a result of the control node determining that the first link does not have available resources for carrying the packet comprising the user data for the non-priority UE, the control node transmitting the packet to the second access node via the alternate link, wherein transmitting the packet to the second access node via the alternate link comprises:

the control node buffering the packet at least until the occurrence of a period of time during which the control node does not have an opportunity to transmit data to first access node via the first link; and during the period of time, transmitting the data to the second access node via the alternate link.

3. The method of claim 1, further comprising the second access node prioritizing the second link between the second access node and the first access node for the priority UE.

4. The method of claim 1, further comprising:

the second access node receiving data transmitted by the non-priority UE;

the second access node determining that the second link between the second access node and the first access node does not have available resources for carrying the data transmitted by the non-priority UE; and as a result of the second access node determining that the second link between the second access node and the first access node does not have available resources for carrying the data transmitted by the non-priority UE, the second access node transmitting the data to the control node via the alternate link, wherein transmitting the data to the control node via the alternate link comprises:

the second access node buffering the data at least until the occurrence of a period of time during which the second access node does not have an opportunity to transmit data to first access node via the second link; and during the period of time, transmitting the data to the control node via the alternate link.

5. The method of claim 1, further comprising:

the second access node determining that the priority UE is attempting to establish a connection with the network via the second access node; and after determining that the priority UE is attempting to establish the connection, the second access node freeing resources and allocating the freed resources to the priority UE, wherein freeing resources comprises the second access node clearing from a transmit buffer for the second link between the second access node and the first access node data that was received from the non-priority UE or prepared for transmitting to the non-priority UE, thereby freeing resources for the priority UE.

6. The method of claim 1, further comprising:

the first access node determining that the priority UE is attempting to establish a connection with the network; and after determining that the priority UE is attempting to establish the connection, the first access node freeing resources and allocating the freed resources to the priority UE.

7. The method of claim 1, wherein the control node determines that the priority UE is attempting to establish a connection with the network by receiving, via the first link, a Radio Resource Control (RRC) message transmitted by the priority UE.

8. The method of claim 1, further comprising:

after determining that the priority UE is attempting to establish a connection, prioritizing the second link for the priority UE.

9. The method of claim 1, further comprising:

after the control node determines that a priority UE is attempting to establish a connection with the network, the control node transmitting to the first and/or second access node a message comprising an identifier identifying the priority UE and indicating that the identified UE is a priority UE.

10. A non-transitory computer readable storage medium storing a computer program comprising instructions which when executed by processing circuitry of a control node causes the control node to perform the method of claim 1.

11. The method of claim 1, further comprising:

the control node generating a packet comprising user data for the non-priority UE;

the control node determining that the first link does not have available resources for carrying the packet; and as a result of the control node determining that the first link does not have available resources for carrying the packet comprising the user data for the non-priority UE, the control node transmitting the packet to the second access node via the alternate link, wherein transmitting the packet to the second access node via the alternate link comprises:

the control node determining the start of a period of time during which the first access node is in an off state;

the control node buffering the packet at least until the start of the period of time during which the first access node is in the off state; and during the period of time during which the first access node is in the off state, transmitting the data to the second access node via the alternate link.

12. A method in an integrated access and backhaul (IAB) network comprising a control node wherein the control node is a donor node in the IAB network, a first access node wherein the first access node is a parent node in the IAB network, and a second access node wherein the second access node is a child node of the first access node in the IAB network, wherein there is a first link between the control node and the first access node and there is a second link between the second access node and the first access node, the method comprising:

the second access node providing network access to a non-priority user equipment, UE (UE);

the second access node determining that a priority UE is attempting to establish a connection with the network;

after determining that the priority UE is attempting to establish a connection with the network, the second access node prioritizing the second link for the priority UE; and the second node determining an alternate link to the control node for use in carrying traffic for and/or from the non-priority UE, wherein the second access node determines that a priority UE is attempting to establish a connection with the network via the second access node by:

receiving, via a Physical Random Access Channel (PRACH), a random access preamble transmitted by the priority UE; and determining that the random access preamble is a preamble reserved for priority UEs or determining that a PRACH occasion that was used to transmit the random access preamble is reserved for priority UEs.

13. The method of claim 12, further comprising:

the second access node receiving data transmitted by the non-priority UE;

the second access node determining that the second link between the second access node and the first access node does not have available resources for carrying the data transmitted by the non-priority UE; and as a result of the second access node determining that the second link between the second access node and the first access node does not have available resources for carrying the data transmitted by the non-priority UE, the second access node transmitting the data to the control node via the alternate link, wherein transmitting the data to the control node via the alternate link comprises:

the second access node buffering the data at least until the occurrence of a period of time during which the second access node does not have an opportunity to transmit data to first access node via the second link; and during the period of time, transmitting the data to the control node via the alternate link.

14. The method of claim 12, further comprising:

after determining that the priority UE is attempting to establish the connection, the second access node freeing resources and allocating the freed resources to the priority UE, wherein freeing resources comprises the second access node clearing from a transmit buffer for the second link between the second access node and the first access node data that was received from the non-priority UE, thereby freeing resources for the priority UE.

15. The method of claim 12, wherein the second access node determines that a priority UE is attempting to establish a connection with the network via the second access node by: i) receiving, via the PRACH, the random access preamble transmitted by the priority UE or ii) or receiving a priority identifier from the control node.

16. A non-transitory computer readable storage medium storing a computer program comprising instructions which when executed by processing circuitry of an access node causes the access node to perform the method of claim 12.

17. A control node in an integrated access and backhaul (IAB) network comprising the control node wherein the control node is a donor node in the IAB network, a first access node wherein the first access node is a parent node in the IAB network, and a second access node wherein the second access node is a child node of the first access node in the IAB network, wherein there is a first link between the control node and the first access node and there is a second link between the first access node and the second access node, and wherein the second access node provides network access to a non-priority user equipment (UE), the control node comprising:

processing circuitry; and a memory, the memory containing instructions executable by the processing circuitry for configuring the control node to perform a process comprising:

determining that a priority UE is attempting to establish a connection;

after determining that the priority UE is attempting to establish a connection, prioritizing, for the priority UE, at least the first link between the control node and the first access node; and determining an alternate link to the second access node for use in carrying traffic to and/or from a non-priority UE to which the second access node provides access, wherein the control node determines the alternate link to the second access node prior to the control node determining that the priority UE is attempting to establish a connection with the network, and the control node determines the alternate link to the second access node based on a predicted channel condition, a distribution of traffic in the network, and/or a traffic prediction for the priority UE.

18. A second access node in an integrated access and backhaul (IAB) network comprising a control node wherein the control node is a donor node in the IAB network, a first access node wherein the first access node is a parent node in the IAB network, and the second access node wherein the second access node is a child node of the first access node in the IAB network, wherein there is a first link between the control node and the first access node and there is a second link between the second access node and the first access node, the second access node comprising:

processing circuitry; and a memory, the memory containing instructions executable by the processing circuitry for configuring the second access node to perform a process comprising:

providing network access to a non-priority user equipment (UE);

determining that a priority UE is attempting to establish a connection with the network;

after determining that the priority UE is attempting to establish a connection with the network, prioritizing the second link for the priority UE; and determining an alternate link to the control node for use in carrying traffic for and/or from the non-priority UE, wherein the second access node determines that a priority UE is attempting to establish a connection with the network via the second access node by receiving, via a Physical Random Access Channel, PRACH, a random access preamble transmitted by the priority UE and determining that the random access preamble is a preamble reserved for priority UEs or determining that a PRACH occasion that was used to transmit the random access preamble is reserved for priority UEs.

* * * * *